(12) United States Patent
Kye et al.

(10) Patent No.: US 7,808,584 B2
(45) Date of Patent: Oct. 5, 2010

(54) POLARIZER, METHOD OF FABRICATING THE SAME AND LIQUID CRYSTAL DISPLAY HAVING THE SAME

(75) Inventors: Myeong-Ha Kye, Suwon-si (KR); Seung-Ju Lee, Gwangmyeong-si (KR); Yun Jang, Suwon-si (KR); Seung-Hee Lee, Seoul (KR); Joon-Hyung Park, Seoul (KR); Kyoung-Jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 12/034,382

(22) Filed: Feb. 20, 2008

(65) Prior Publication Data

US 2008/0198305 A1 Aug. 21, 2008

(30) Foreign Application Priority Data

Feb. 20, 2007 (KR) .................. 10-2007-0017102

(51) Int. Cl.
*G02F 1/1335* (2006.01)

(52) U.S. Cl. ........................... 349/96; 349/117

(58) Field of Classification Search ............ 349/96, 349/117, 118; 359/485, 497, 500, 577, 483; 264/1.34; 353/20; 362/19; 428/1.3
See application file for complete search history.

(56) References Cited

U.S. PATENT DOCUMENTS

| 7,511,792 B2 * | 3/2009 | Chang et al. ............... 349/141 |
| 7,582,339 B2 * | 9/2009 | Kim et al. ................... 428/1.3 |
| 2004/0239850 A1 * | 12/2004 | Kim ........................ 349/117 |
| 2007/0286969 A1 * | 12/2007 | Nagpal et al. ............. 428/1.31 |

* cited by examiner

*Primary Examiner*—Thoi V Duong
(74) *Attorney, Agent, or Firm*—H.C. Park & Associates, PLC

(57) ABSTRACT

Disclosed are a polarizer, a method for fabricating the same, and a liquid crystal display having the same. The liquid crystal display includes a liquid crystal panel and a polarizer attached to the liquid crystal panel. The polarizer includes a polarizing film, a first support film, and a second support film. The first support film has optical anisotropy and is attached to the polarizing film. The first support film has a first thickness. The second support film is attached to the polarizing film while facing the first support film and has a second thickness, which is greater than the first thickness. The polarizer is fabricated by evaporating a solvent from a solution including polymer resin to form an optical film and then elongating the optical film.

13 Claims, 12 Drawing Sheets

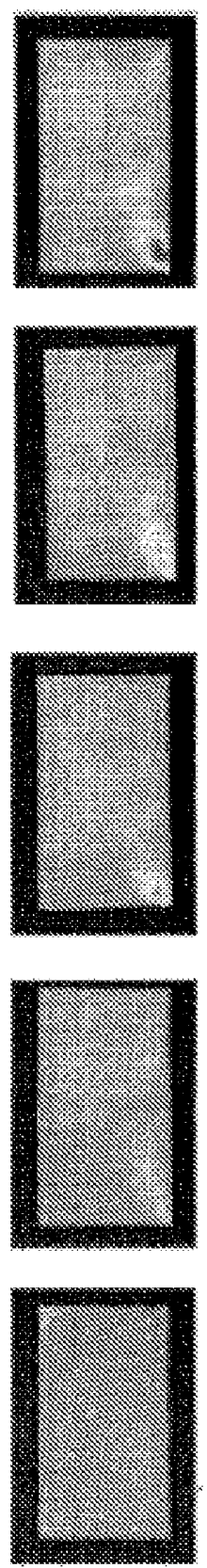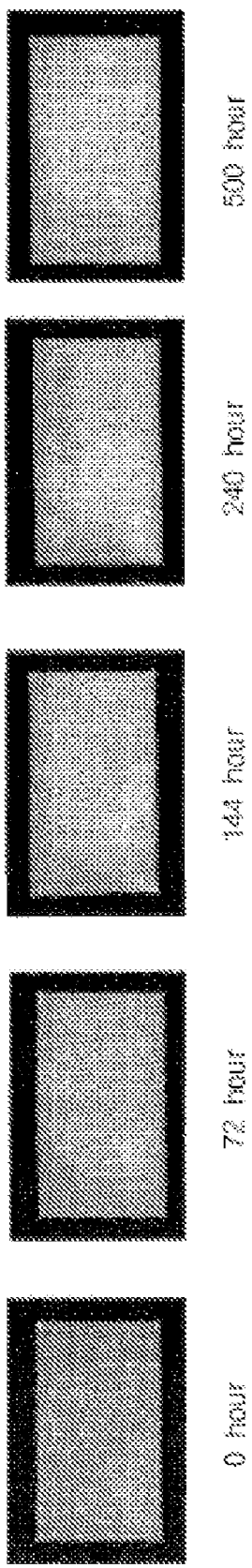

POLARIZER, METHOD OF FABRICATING THE SAME AND LIQUID CRYSTAL DISPLAY HAVING THE SAME

CROSS-REFERENCE TO RELATED APPLICATION

This application claims the benefit of and priority from Korean Patent Application No. 2007-17102, filed on Feb. 20, 2007, which is hereby incorporated by reference for all purpose as if fully set forth herein.

BACKGROUND OF THE INVENTION

1. Field of the Invention

The present invention relates to a polarizer, a method of fabricating the same, and a liquid crystal display having the same. More particularly, the present invention relates to a polarizer capable of displaying high-quality images, a method of fabricating the same, and a liquid crystal display having the same.

2. Discussion of the Background

Generally, a liquid crystal display (LCD) uses liquid crystals to display an image by converting electric signals into visual information. The LCD includes a liquid crystal panel containing liquid crystal therein and polarizers attached to outer portions of the liquid crystal panel. A first polarizer may be provided on an upper portion of the liquid crystal panel, and a second polarizer may be provided on a lower portion of the liquid crystal panel. The two polarizers have transmission axes, which are perpendicular to each other, and that linearly polarize light passing through the polarizers in parallel to each transmission axis thereof. The LCD transmits or absorbs light passing through the liquid crystal panel by using the polarizer, thereby displaying images.

However, various factors may cause image quality degradation in the LCD. Because there are various factors that may degrade image quality, preventing degradation by analyzing the factors is difficult. For example, a "corner Mura" occurs when a corner portion of the image is brighter than other portions of the image. It is assumed that the polarizer generates the corner Mura.

SUMMARY OF THE INVENTION

The present invention provides a polarizer that may be capable of displaying high-quality images and preventing the corner Mura.

The present invention also provides a method of fabricating the polarizer.

The present invention also provides a liquid crystal display including the polarizer.

Additional features of the invention will be set forth in the description which follows, and in part will be apparent from the description, or may be learned by practice of the invention.

The present invention discloses a polarizer that includes a polarizing film, a first support film, and a second support film. The first support film has optical anisotropy and is attached to one side of the polarizing film. The first support film has a first thickness of 70 µm or less. The second support film is attached to the other side of the polarizing film while facing the first support film and has a second thickness, which is greater than the first thickness.

The present invention also discloses a method of forming a polarizer including forming a polarizing film, forming a support film having optical anisotropy and a first thickness of about 30 µm to about 70 µm, and attaching the support film to the polarizing film. Forming the support film includes providing a solution containing polymer resin on a stage, forming an optical film by evaporating a solvent from the solution while moving the stage, and elongating the optical film by rotating a roller, which contacts the optical film, at a speed corresponding to a moving speed of the stage.

The present invention also discloses a liquid crystal display that includes a liquid crystal panel including first and second substrates facing each other with a liquid crystal layer interposed therebetween. A polarizer is attached to at least one of the first and second substrates. The polarizer includes a polarizing film, a first support film, and a second support film. The first support film has optical anisotropy and is attached to one side of the polarizing film. The first support film has a first thickness of 70 µm or less. The second support film is attached to the other side of the polarizing film while facing the first support film and has a second thickness, which is greater than the first thickness.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 8A is a photographic view showing graphs that represent variation of image quality according to driving time of a conventional LCD.

FIG. 8B is a photographic view showing graphs that represent variation of image quality according to driving time of an LCD according to an exemplary embodiment of the present invention.

DETAILED DESCRIPTION OF THE ILLUSTRATED EMBODIMENTS

Figure 1:
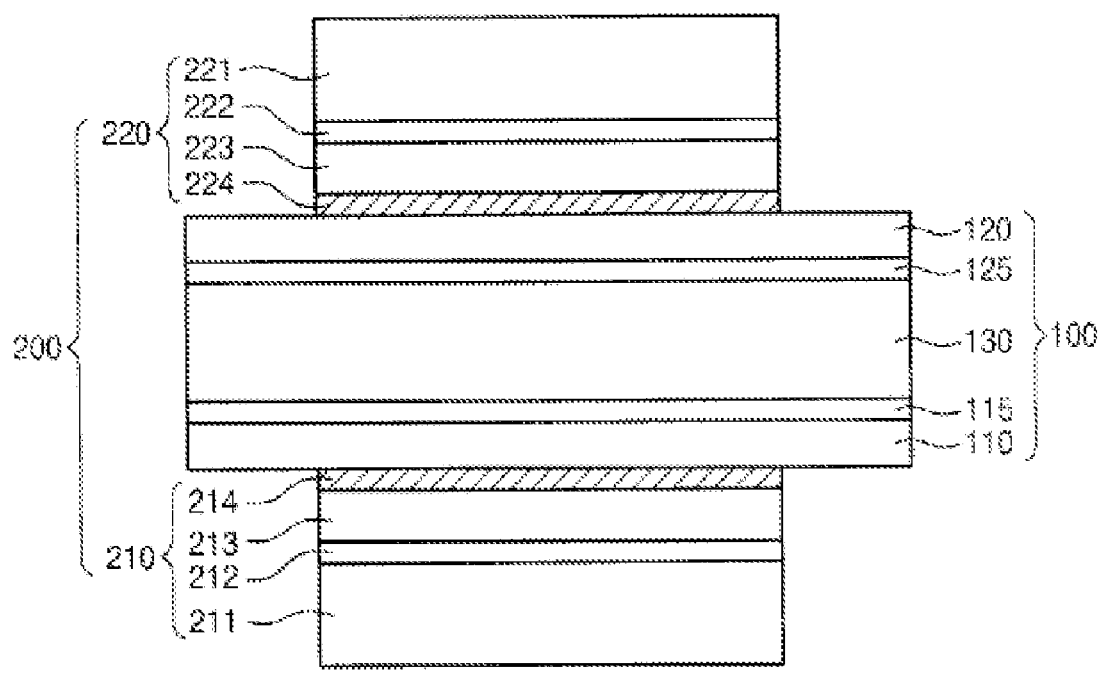
FIG. 1 is a sectional view showing a liquid crystal display (LCD) according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "attached to", or "connected to" another element or layer, it can be directly on, directly attached to, or directly connected to the other element or layer, or intervening elements or layers may be present. In contrast, when an element is referred to as being "directly on", "directly attached to", or "directly connected to" another element or layer, there are no intervening elements or layers present.

FIG. 1 is a sectional view showing a liquid crystal display (LCD) according to an exemplary embodiment of the present invention.

Referring to FIG. 1, the LCD includes a liquid crystal panel 100 and polarizers 200. The liquid crystal panel 100 includes a first substrate 110 and a second substrate 120 facing each other. Transparent electrodes are formed on the first and second substrates 110 and 120, respectively. A pixel electrode 115, which is separately aligned according to pixels that display the image thereon, is formed on the first substrate 110. A data voltage corresponding to image information is applied to the pixel electrode 115. A common electrode 125, which is integrally formed regardless of the pixels, is formed on the second substrate 120. A constant reference voltage is applied to the common electrode 125. A liquid crystal layer 130 is interposed between the pixel electrode 115 and the common electrode 125.

The polarizers 200 are attached to outer portions of the liquid crystal display panel 100. Specifically, a first polarizer 210 is attached to an outer portion of the first substrate 110, and a second polarizer 220 is attached to an outer portion of the second substrate 120. The first polarizer 210 includes a first support film 211, a first polarizing film 212, a second support film 213, and a first adhesive layer 214. The second polarizer 220 includes a third support film 221, a second polarizing film 222, a fourth support film 223, and a second adhesive layer 224. The components of the first polarizer 210 are aligned symmetrically to the components of the second polarizer 220 about the liquid crystal panel 100.

The first and second polarizing films 212 and 222 polarize light in a predetermined direction, and they include optical films containing poly vinyl alcohol (PVA) compounds. The optical film absorbs iodine (I) or dichromatic dye to be elongated in one direction. Thus, an absorption axis is formed along the elongation direction of the optical film, so that the optical film can absorb light parallel to the absorption axis.

The first and second support films 211 and 213 face each other about the first polarizing film 212 so as to support the first polarizing film 212. The second support film 213 is thinner than the first support film 211. The third and fourth support films 221 and 223 face each other about the second polarizing film 222 so as to support the second polarizing film 222. The fourth support film 223 is thinner than the third support film 221. In detail, the first and third support films 211 and 221 may be about 80 μm thick to effectively support the first and second polarizing films 212 and 222, respectively. In contrast, the second and fourth support films 213 and 223 may be about 70 μm thick or less. The second and fourth support films 213 and 223 are thinner because they serve to improve the image quality of the LCD as well as to support the polarizing films 212 and 222, respectively. The role of the second and fourth support films 213 and 223 in improving the image quality of the LCD will be described below.

A protective film may be formed on the exposed surface of the third support film 221, or the exposed surface can be treated. For example, the third support film 221 may be subject to anti-static (A/S) treatment by using conductive particles. In this case, static electricity may be prevented from being introduced into the liquid crystal panel 100, so that the LCD may be prevented from malfunctioning. In addition, the third support film 221 may be subject to anti glare (A/G) treatment by forming corrugation on the surface of the third support film 221. In this case, external light may be prevented from being reflected in the front direction from the surface of the third support film 221, thereby preventing glare.

The first adhesive layer 214 is positioned between the first substrate 110 and the second support film 213 to couple the first polarizer 210 to the liquid crystal panel 100. The second adhesive layer 224 is positioned between the second substrate 120 and the fourth support film 223 to couple the second polarizer 220 to the liquid crystal panel 100. The first and second polarizers 210 and 220, which are attached using the first and second adhesive layers 214 and 224, can be detached from the liquid crystal panel 100, if necessary. For instance, if the polarizer 200 has a defect, the polarizer 200 may be detached from the liquid crystal panel 100, and the liquid crystal panel 100 may be reused.

Figure 2:
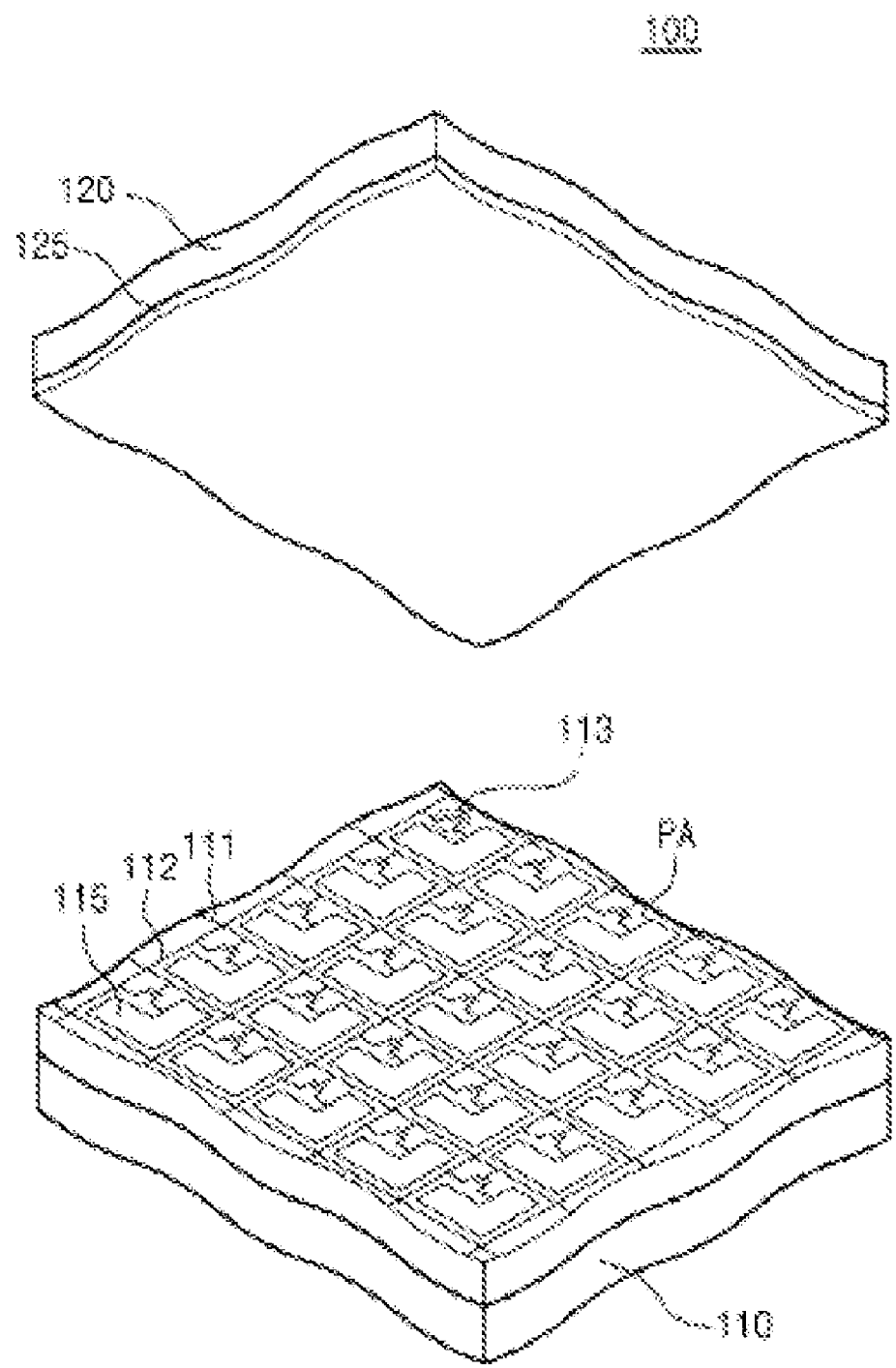
FIG. 2 is an enlarged perspective view of the liquid crystal panel shown in FIG. 1.

FIG. 2 is an enlarged perspective view of the liquid crystal panel 100 shown in FIG. 1.

Referring to FIG. 2, gate lines 111 and data lines 112 are formed on the first substrate 110. The gate lines 111 cross the data lines 112 and are insulated from the data lines 112, thereby defining a plurality of pixel areas (PAs). A thin film transistor 113 and a pixel electrode 115 are provided in each pixel area PA. The thin film transistor 113 includes a control electrode connected to the gate line 111, an input electrode connected to the data line 112, and an output electrode facing the input electrode and connected to the pixel electrode 115.

A common electrode 125 is formed on the second substrate 120 to face the pixel electrode 115. A light blocking layer pattern may be formed between the second substrate 120 and the common electrode 125. The light blocking layer pattern is positioned corresponding to the gate lines 111 and the data lines 112 to block the light on the boundary of the pixel area PA. A color filter may be formed on the light blocking layer pattern to display a color image.

The operation of the LCD having the above structure will be described below.

Figure 3A:
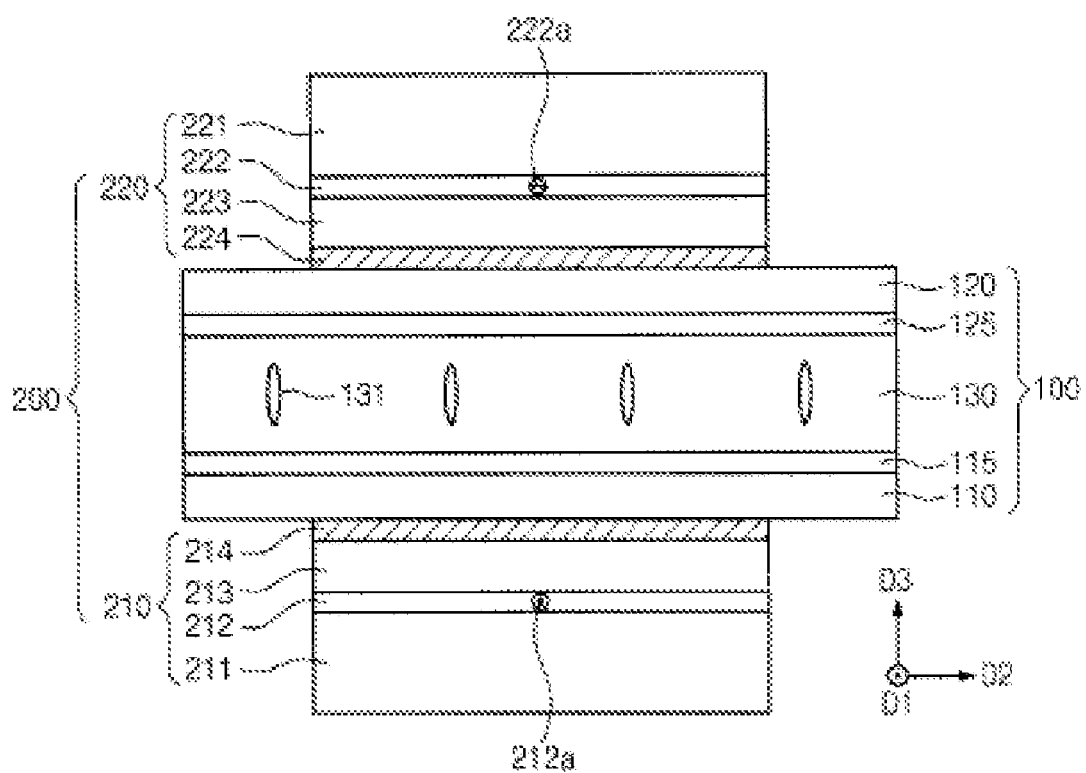
FIG. 3A and FIG. 3B are sectional views showing the operation of the LCD shown in FIG. 1.
Figure 3B:
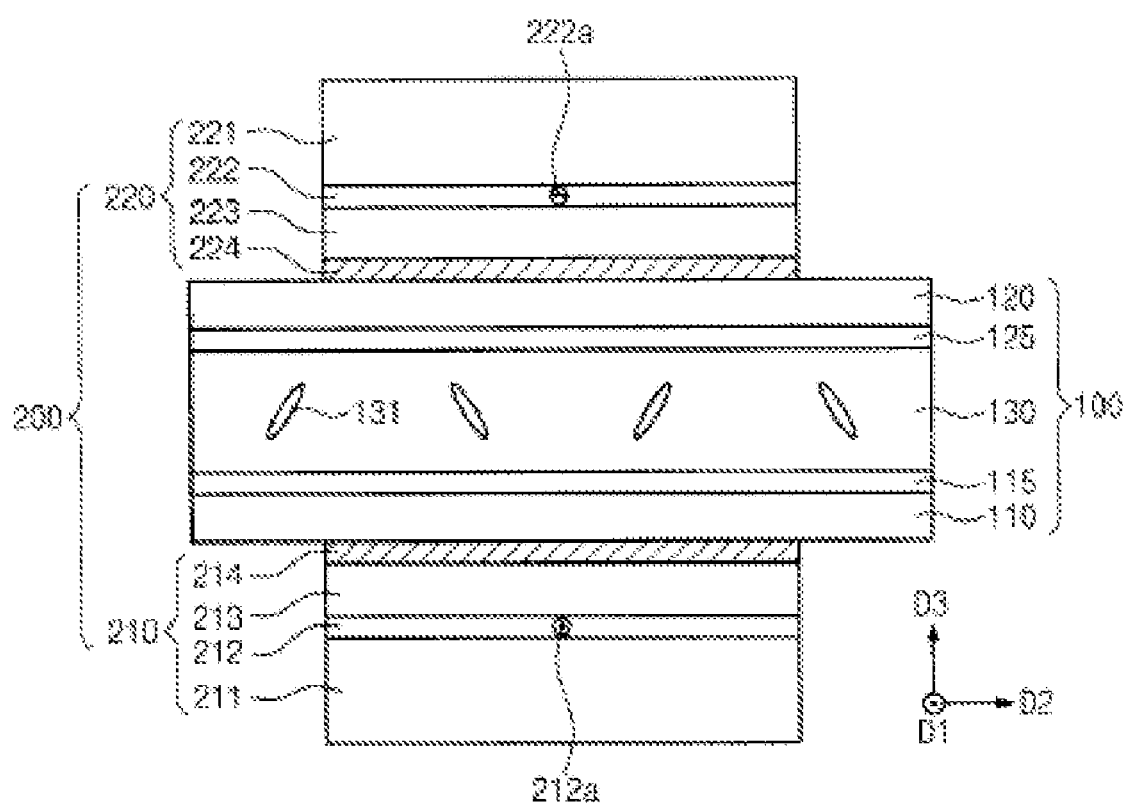

FIG. 3A and FIG. 3B are sectional views showing the operation of the LCD shown in FIG. 1.

Referring to FIG. 2 and FIG. 3A, the LCD is converted into a black state and a white state according to the electric field applied to the liquid crystal layer 130. With a vertical alignment (VA) mode LCD, the liquid crystal 131 contained in the liquid crystal layer 130 is aligned perpendicularly to the first and second substrates 110 and 120 when an electric field is not applied to the liquid crystal layer 130. At this alignment, the LCD is converted into the black state by means of the first and second polarizing films 212 and 222 having transmission axes perpendicular to each other. The liquid crystal 131 alignment direction is defined according to the long-axis direction of the liquid crystal 131.

Since the liquid crystal 131 is non-emissive, the LCD typically includes a light emitting unit to provide light used to display an image. Alternatively, the LCD may display an image using light incident from the exterior. The light emitting unit supplies light from behind the liquid crystal panel 100, so that light may pass through the first polarizer 210, the liquid crystal panel 100, and the second polarizer 220. Light incident from the exterior passes through the second polarizer 220 and then is reflected from the liquid crystal panel 100. Then, the light is output to the exterior through the second polarizer 220. In this type of LCD, the first polarizer 210 can be omitted.

The operation of an LCD including a light emitting unit will be described below. For the purpose of convenience, first and second directions D1 and D2 refer to two directions that define a plane surface perpendicular to the traveling direction of the light, and the traveling direction of the light is referred to as a third direction D3. The first polarizing film 212 has a first transmission axis 212a, which is parallel to the first direction D1, and the second polarizing film 222 has a second transmission axis 222a, which is parallel to the second direction D2.

The light supplied from the light emitting unit is linearly polarized in the first direction D1 while passing through the first polarizer 210. The linearly polarized light is incident into the second polarizer 220 after passing through the liquid crystal layer 130. Then, the incident light is absorbed in the second polarizer 210 having the second transmission axis 222a extending in the second direction D2, which is perpendicular to the first direction D1, so the LCD becomes the black state.

Referring to FIG. 2 and FIG. 3B, in the white state of the LCD, a gate signal and a data signal are transmitted to the gate line 111 and data line 112, respectively. The thin film transistor 113 is turned on by the gate signal, so that a data voltage corresponding to the data signal is applied to the pixel electrode 115. At the same time, a common voltage having a constant value is applied to the common electrode 125. The difference between the data voltage and the common voltage applies an electric field to the liquid crystal layer 130. In the case of a VA mode LCD, the liquid crystal 131 has negative dielectric anisotropy, so that the liquid crystal 131 tends to align perpendicularly to the electric field. Therefore, the electric field tilts the liquid crystal 131 relative to the first and second substrates 110 and 120.

In this state, light supplied from the light emitting unit may be linearly polarized while passing through the first polarizer 210. The linearly polarized light then passes through the liquid crystal layer 130. Here, the liquid crystal 131, which is tilted relative to the substrates 110 and 120, changes the polarization direction of the light. The light having the changed polarization direction includes components that are parallel to the second direction D2. The light components that are parallel to the second direction D2 pass through the second polarizer 220. As a result, the LCD becomes the white state. The brightness of the LCD may be proportional to the intensity of the electric field.

Contrast ratio refers to a ratio between the lowest gray scale black state and the highest gray scale white state. If the contrast ratio increases, high-quality images may be displayed. But the contrast ratio may be reduced at the lateral side of the LCD, so that the image quality may be degraded at the lateral side of the LCD.

A compensation film may be used to improve the image quality at the lateral side of the LCD. The compensation film is provided in at least one of the first and second polarizers 210 and 220.

According to the present exemplary embodiment, the second and fourth supporting films 213 and 223 may serve as the compensation films. The compensation films are classified into various optical films according to components thereof, and the optical films are subject to the elongation process when fabricating the compensation films.

The optical film may be elongated in one direction or two directions during the elongation process. The optical film has optical anisotropy through the elongation process. The optical film's optical characteristics are determined according to the elongation direction and elongation degree of the optical film.

If the refractive index of the optical film is N1, N2, and N3 in the first, second, and third directions D1, D2, and D3, respectively, the optical film has refractive index anisotropy, except when N1, N2, and N3 equal each other. Due to this refractive index anisotropy, phase retardation difference may occur between components of light passing through the optical film, thereby changing the light's polarization direction. In the following description, phase retardation with respect to the surface defined in the first and second directions D1 and D2 will be referred to as "phase retardation in the surface direction", and phase retardation in the third direction D3 will be referred to as "phase retardation in the thickness direction."

In detail, if the thickness of the optical film is "d", the phase retardation value in the surface direction Ro and the phase retardation value in the thickness direction Rth are defined as follows.

$$Ro = |N1 - N2| \times d$$

$$Rth = |(N1 + N2)/2 - N3| \times d$$

In the LCD, the phase retardation value in the surface direction Ro is related to phase variation of light incident in the front direction of the LCD, and the phase retardation value in the thickness direction Rth is related to phase variation of light incident in the lateral direction of the LCD. Thus, the compensation film adjusts the phase retardation value in the thickness direction Rth to improve the image quality in the lateral direction of the LCD.

Optical films including Cyclo Olefin Polymer (COP) or Tri Acetate Cellulose (TAC) compound may be used as the compensation film. Since the COP-based optical film may have superior strength, it may be sufficiently elongated so that it may have an acceptable phase retardation value in the thickness direction. In contrast, the TAC-based optical film has hydrophilic characteristics, so that it may be easily bonded to the polarizing film.

As described above, since the COP-based optical film and the TAC-based optical film have their own advantages, and one or both of the COP-based optical film and the TAC-based optical film can be used according to applications thereof. For example, the COP-based optical film may be used for the second support film 213, and the TAC-based optical film may be used for the fourth support film 223. Additionally, either COP-based optical films or TAC-based optical films may be used for both the second and fourth support films 213 and 223.

The TAC-based optical film may have superior endurance, so that it may be used for the first and third support films 211 and 221. However, components of the TAC-based optical film used for optical compensation are different from components of the TAC-based optical film used for support. In detail, the TAC-based optical film used for optical compensation may include a Cellulose Diacetate Propionate compound expressed by chemical formula 1, and the TAC-based optical film used for support may include a Tri Acetate Cellulose compound expressed by chemical formula 2.

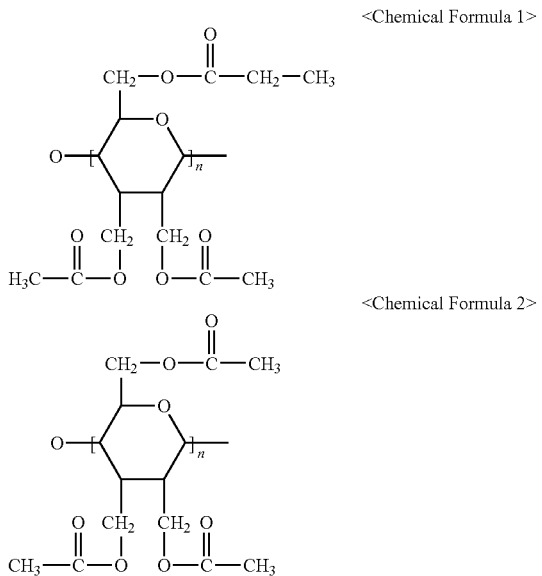

<Chemical Formula 1>

<Chemical Formula 2>

The Cellulose Diacetate Propionate compound may be obtained by replacing one acetate of TAC with a Propionate group. In addition to the difference in compositions, the TAC-based optical film that is used for optical compensation is different from the TAC-based optical film that is used for support in that the TAC-based optical film that is used for optical compensation is subject to the elongation process during fabrication.

In the first polarizer 210, the second support film 213, which is used for optical compensation, is thinner than the first support film 211, which is used for support. Additionally, in the second polarizer 220, the fourth support film 223, which is used for optical compensation, is thinner than the third support film 221, which is used for support. If the second and fourth support films 213 and 223 are thinner than the first and third support films 211 and 221, the corner Mura may be prevented and image quality of the LCD may be improved.

Figure 4A:
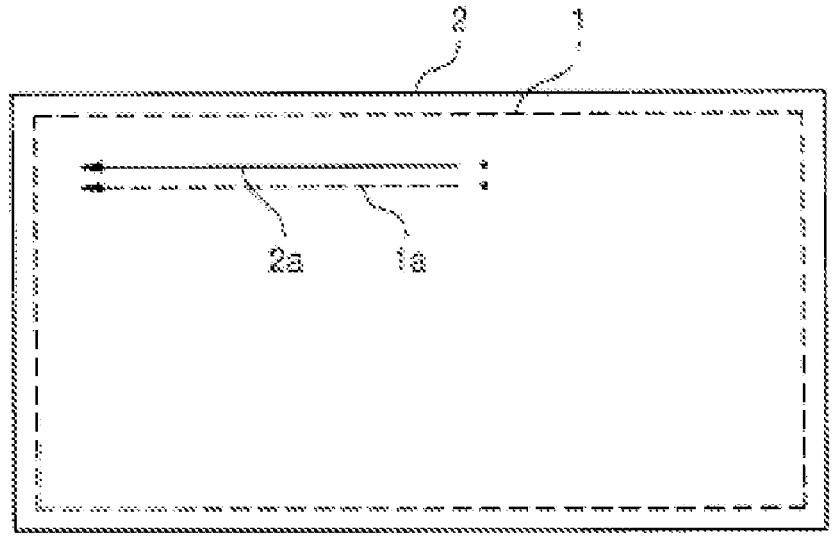
FIG. 4A and FIG. 4B are views showing axis deviation occurring in a conventional LCD due to difference in shrinkage.
Figure 4B:
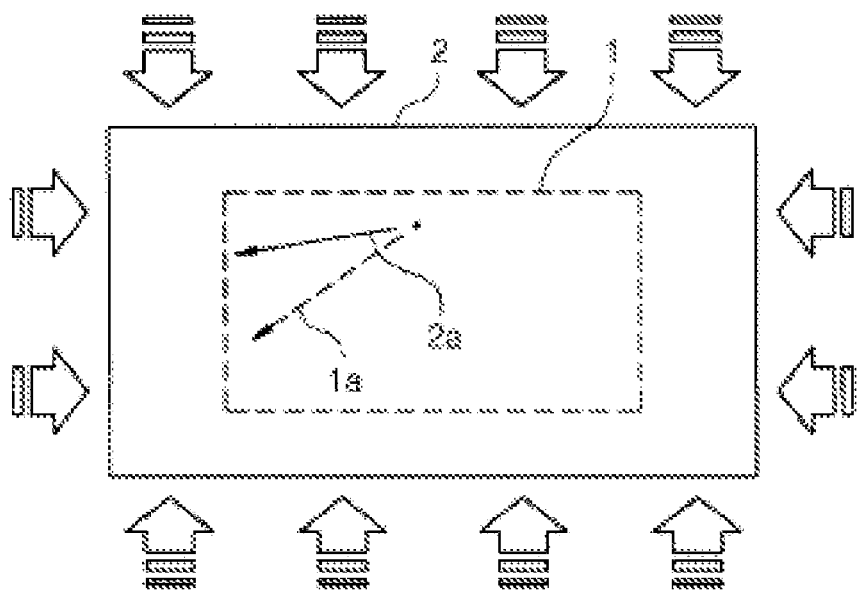

FIG. 4A and FIG. 4B are views showing axis deviation occurring in a conventional LCD due to differences in shrinkage.

Referring to FIG. 4A, in the polarizer of a conventional LCD, a polarizing film 1 is attached to a compensation film 2 while facing each other. The polarizing film 1 and the compensation film 2 have optical axes 1a and 2a, respectively. The optical axes 1a and 2a correspond to the elongation direction of the polarizing film 1 and the compensation film 2. In addition, the optical axis 1a of the polarizing film 1 matches with the optical axis 2a of the compensation film 2.

Referring to FIG. 4B, various external influences are exerted upon the LCD when the LCD is fabricated or used. For example, the LCD may be tested by applying heat to a chamber while driving the LCD for a predetermined period of time. In this case, heat is transferred to the polarizing film 1 and the compensation film 2 provided in the polarizer during the test process. Since the polarizing film 1 and the compensation film 2 are fabricated through the elongation process, if heat is applied to the polarizing film 1 and the compensation film 2, the elongated parts may shrink and return to their initial state. However, they do not shrink uniformly. For instance, when the polarizing film 1 has a rectangular shape, the shrinkage of the polarizing film 1 along its long side differs from that along its short side, thereby causing the optical axis 1a of the polarizing film 1a to deviate from its initial position. Such shrinkage may similarly occur in the compensation film 2, so that the film's optical axis 2a deviates from its initial position. Since the material of the polarizing film 1 differs from the material of the compensation film 2, the polarizing film 1 shrinks at a different degree than the compensation film 2. As a result, as shown in FIG. 4B, the optical axis 1a of the polarizing film 1 is not parallel to the optical axis 2a of the compensation film 2. In other words, the optical axis 1a of the polarizing film 1 may deviate from the optical axis 2a of the compensation film 2. The degree of deviation increases at the corner of the films rather than the center of the films. Due to the deviation between the optical axis 1a and the optical axis 2a at the corner of the films, degradation of image quality, by corner Mura, may occur. Such axis deviation may be analyzed by using the Poincare sphere.

Figure 5A:
FIG. 5A is a photographic view showing the analysis result for corner Mura occurring in a VA LCD.

FIG. 5A is a photographic view showing the analysis result for corner Mura occurring in a VA LCD.

Referring to FIG. 5A, in the black state, light leakage occurs at each corner of the LCD, causing the corner Mura. The degree of light leakage differs depending on the positions in the pixel area. That is, in the VA LCD, the pixel area is divided into a plurality of domains according to the alignment direction of the liquid crystal, and the domains compensate for each other to improve the LCD's operational characteristics. As shown in FIG. 5A, the upper domain is brighter than the lower domain in the left upper portion and the right lower portion of the LCD. In contrast, the lower domain is brighter than the upper domain in the left lower portion and the right upper portion of the LCD.

Figure 5B:
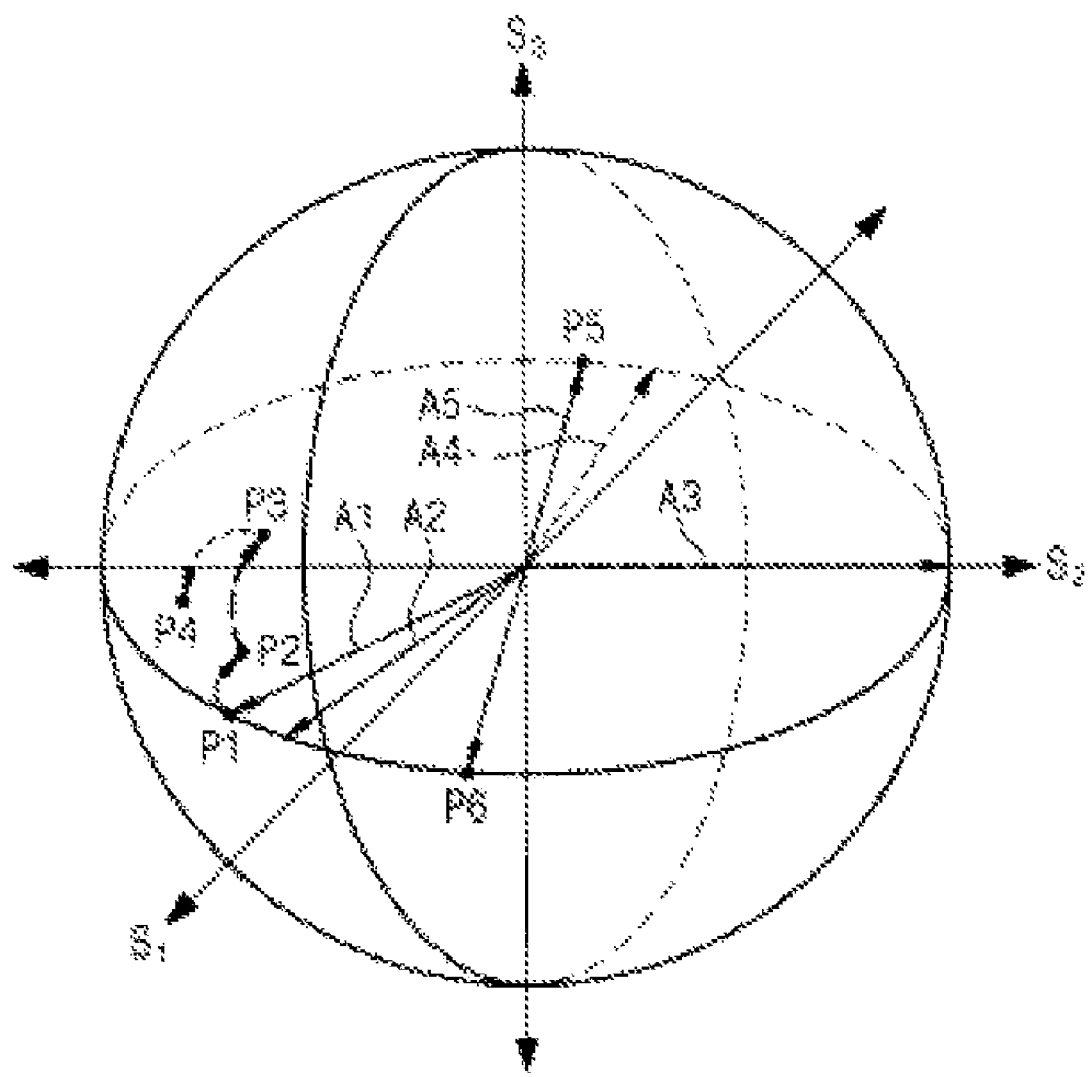
FIG. 5B and FIG. 5C are views showing axis deviation, which causes corner Mura, in the Poincare sphere.
Figure 5C:
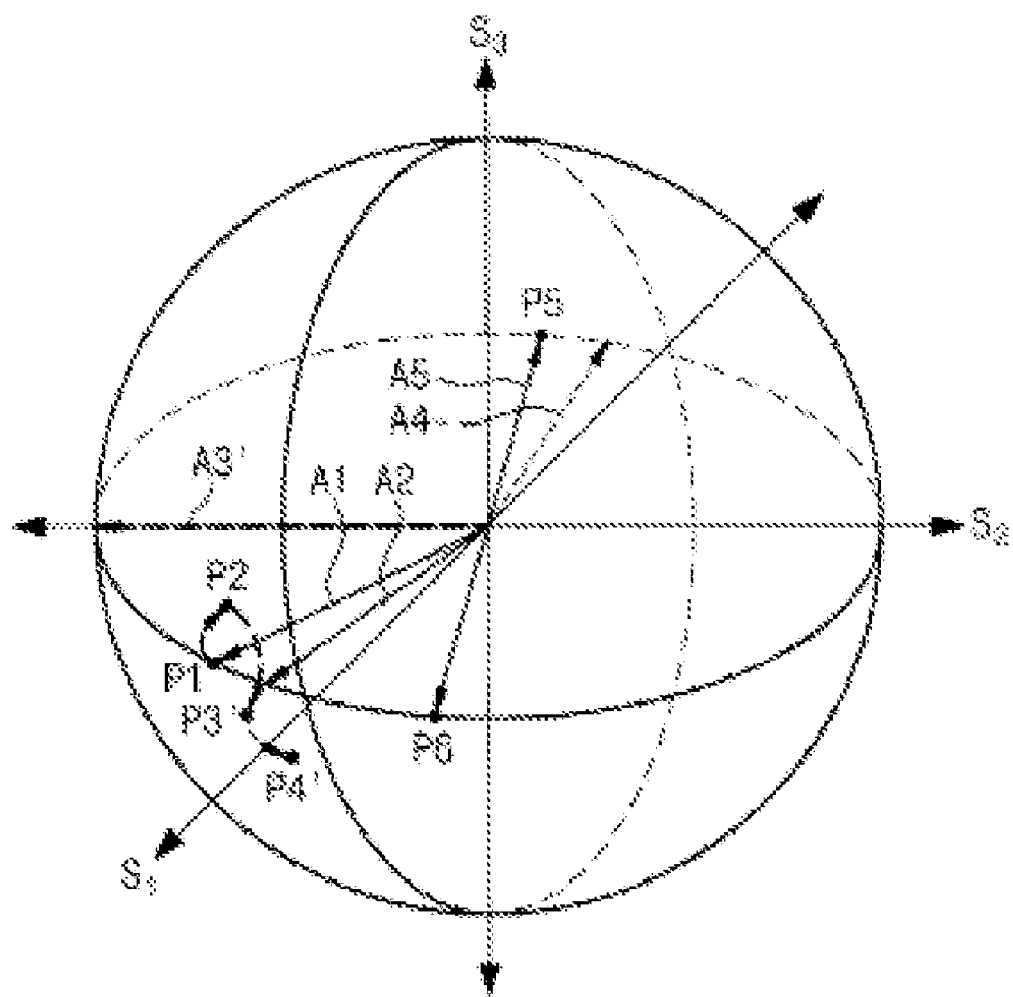

FIG. 5B and FIG. 5C are views showing axis deviation, which causes the corner Mura, in the Poincare sphere.

Referring to FIG. 5B and FIG. 5C, when three axes S1, S2, and S3 are perpendicular to each other in space, the Poincare sphere satisfies the equation $S1^2+S2^2+S3^2=1$. Points provided on the surface of the Poincare sphere represent different polarizing states. For instance, all points on the equator (S3=0) represent the linear polarized state, and two opposite points on the equator represent the linear polarized states in the opposite directions. In addition, in the Poincare sphere, the Arctic (S1=S2=0, S3=1) corresponds to right-handed circular polarization and the Northern Hemisphere corresponds right-handed oval polarization. In addition, the Antarctic (S1=S2=0, S3=−1) corresponds to left-handed circular polarization and the Southern Hemisphere corresponds left-handed oval polarization.

The conventional LCD includes upper and lower polarizers that face each other with the liquid crystal panel interposed therebetween. The upper and lower polarizers have polarizing films and compensation films, respectively. In this case, light passes through the lower polarizing film, the lower compensation film, the liquid crystal layer of the liquid crystal panel, the upper compensation film, and the upper polarizing film. For the purpose of convenience, optical axes of the lower polarizing film, the lower compensation film, the liquid crystal layer, the upper compensation film, and the upper polarizing film will be referred to as a first optical axis A1, a second optical axis A2, a third optical axis A3 or A3', a fourth optical axis A4, and a fifth optical axis A5, respectively. The first and second optical axes A1 and A2 are assumed that they deviate from the normal state (S1=1, S2=S3=0) in which the axis of the lower polarizer is not distorted, and the third and fourth optical axes A3 or A3' and A4 are assumed that they deviate from the normal state (S1=1, S2=S3=0) in which the axis of the upper polarizer is not distorted.

Since the alignment direction of liquid crystal varies depending on domains, the direction of the third optical axis A3 or A3' of the liquid crystal layer may vary depending on the domains. That is, in the left upper and right lower portions of the LCD shown in FIG. 5A, the third optical axis A3 defined by the upper domain is opposite to the third optical axis A3' defined by the lower domain. Similarly, the optical axes in the left lower and right upper portions of the LCD shown in FIG. 5A are opposite to the optical axes in the left upper and right lower portions of the LCD. For instance, the direction of the optical axis defined by the upper domain in the left upper portion of the LCD may be identical to that of the third optical axis A3 defined by the lower domain in the left lower portion of the LCD, and the direction of the optical axis defined by the lower domain in the left upper portion of the LCD may be identical to that of the third optical axis A3' defined by the upper domain in the left lower portion of the LCD.

As shown in FIG. 5B, light incident into the lower polarizing film is linearly polarized in parallel to the first optical axis A1 and in correspondence with the first position P1 on the surface of the Poincare sphere. Light passing through the lower polarizing film passes through the lower compensation film so that the light is converted into the oval polarized light corresponding to the second position P2. The second position P2 is obtained by rotating the first position P1 about the second optical axis A2 at an angle corresponding to the phase variation value of the light generated from the lower compensation film. Such position conversion in the Poincare sphere is also applicable for the liquid crystal layer and the upper compensation film. That is, light passing through the upper domain of the liquid crystal layer is converted into oval polarized light corresponding to the third position P3. In addition, light passing through the liquid crystal layer passes through the upper compensation film, so that the light is converted into oval polarized light corresponding to the fourth position P4.

In the upper polarizing film, the fifth position P5 corresponding to the fifth optical axis A5 represents the brightest white state, and the sixth position P6, which is symmetrical to the fifth position P5, represents the black state. The oval polarized light corresponding to the fourth position P4 is spaced apart from the sixth position P6, which shows that light is partially leaked in the black state.

As shown in FIG. 5C, light passing through the lower polarizing film and the lower compensation film is converted into oval polarized light corresponding to the second position P2 while passing through the first position P1. In addition, light passing through the lower domain of the liquid crystal layer is converted into the oval polarized light corresponding to the third position P3'. Further, light passing through the liquid crystal layer is converted into oval polarized light corresponding to the fourth position P4' while passing through the upper compensation film.

Regarding the interval distance from the sixth position P6 to the fourth position P4 or P4', the interval distance in the lower domain is shorter than the interval distance in the upper domain. That is, the lower domain is closer to the black state as compared with the upper domain, and the amount of light leakage in the lower domain is less than that of the upper domain. The analysis result using the Poincare sphere based on axis deviation coincides with the result shown in FIG. 5A. Thus, the corner Mura is generated due to axis deviation between the polarizing film and the compensation film.

Based on the results of the above analysis, exemplary embodiments of the present invention minimize axis deviation between the polarizing film and the compensation film in order to prevent the corner Mura. For example, in the exemplary embodiment described with reference to FIG. 1, the second and fourth support films 213 and 223, which serve as compensation films, are thinner than that the first and third support films 211 and 221, which have the support function. This is because the variation range of the optical axes of the first and third support films 211 and 221 can be reduced as the thickness of the first and third support films 211 and 221 decreases. In this case, axis deviation of the first and third support films 211 and 221 may be minimized when the films shrink.

Figure 6:
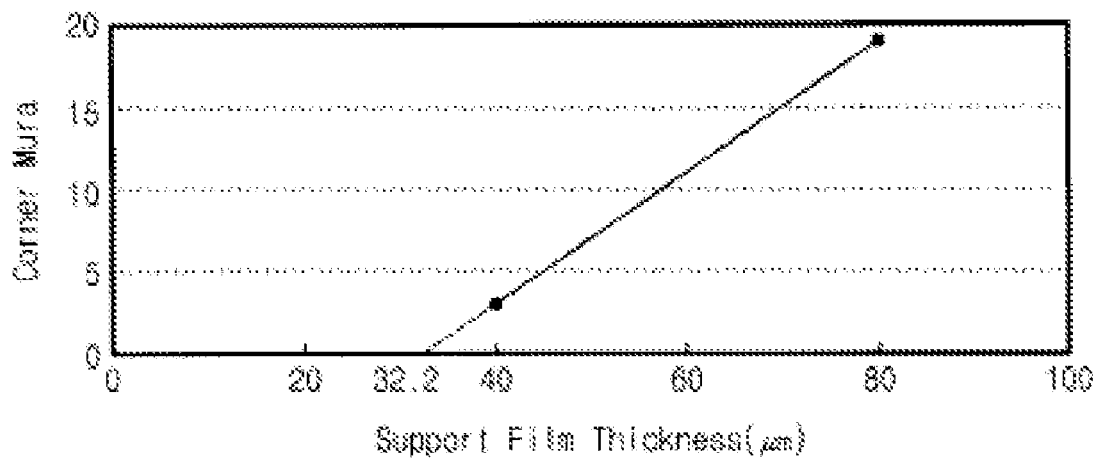
FIG. 6 is a graph showing variation of corner Mura in the LCD according to thickness of a support film having optical anisotropy.

FIG. 6 is a graph showing variation of corner Mura in an LCD according to thickness of the support film having optical anisotropy. In FIG. 6, the x-axis is the thickness of the support film and the y-axis is the measured value of corner Mura. The support film is an optical anisotropic film including Cellulose Diacetate Propionate. As shown in FIG. 1, the support film is used for both first and second polarizers 210 and 220. The corner Mura value is calculated according to the following equation after measuring the brightness in the peripheral area and the corner Mura area.

Corner Mura value=(Mura area brightness−peripheral area brightness)/peripheral area brightness Referring to FIG. 6, the thickness of the support film is linearly proportional to the corner Mura value. In general, if the support film has a thickness in the range of about 40 μm to about 80 μm, the corner Mura value is in the range of about 3 to about 20. Theoretically, if the thickness of the support film is 32.2 μm, the corner Mura is not generated. However, a high-quality image can be displayed when the corner Mura value is about 15 or less.

According to the above-mentioned result, the support film is preferably thin. However, if the support film is too thin, the total thickness of the polarizer becomes thin, causing difficulty when removing the polarizer. For example, when a process fault occurs after attaching the polarizer to the liquid crystal panel, the polarizer is detached from the liquid crystal panel. In this case, a thicker polarizer can be more easily detached from the liquid crystal panel. In contrast, if the polarizer is too thin, the liquid crystal panel may be damaged when detaching the polarizer from the liquid crystal panel. Thus, taking ease of detachment and corner Mura into consideration, the support film should be no more than 70 μm thick. Preferably, the support film has a thickness in the range of about 30 μm to about 50 μm.

Figure 7:
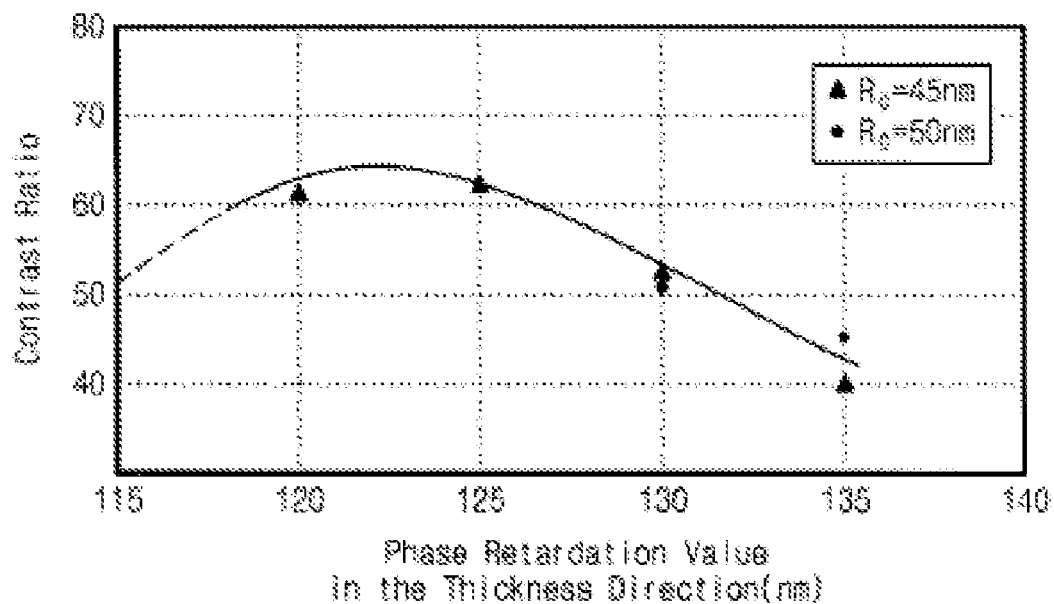
FIG. 7 is a graph showing variation of the contrast ratio in the LCD according to the phase retardation value in the thickness direction of a support film having optical anisotropy.

FIG. 7 is a graph showing variation of the contrast ratio in an LCD according to the phase retardation value in the thickness direction of the support film having optical anisotropy.

In FIG. 7, the x-axis is the phase retardation value in the thickness direction of the support film having optical anisotropy, and the y-axis is the measured contrast ratio. The contrast ratio is obtained from the position which is inclined from the front side to the lateral side of the LCD by an angle of 60°. In addition, the support film is an optical anisotropic film including Cellulose Diacetate Propionate. As shown in FIG. 1, the support film is used for both first and second polarizers 210 and 220.

Referring to FIG. 7, when the phase retardation values in the surface direction Ro are 45 nm and 50 nm, the contrast ratio relative to the phase retardation value in the thickness direction Rth at the lateral side is represented in the form of a parabolic curve, which is convex upward. The fault of the image quality is determined on the basis of the predetermined value (i.e., 40) of the contrast ratio obtained from the lateral side of the LCD. As shown in FIG. 7, the contrast ratio is 40 or less when the phase retardation value in the thickness direction Rth is 140 nm or above. Thus, the phase retardation value in the thickness direction Rth is preferably set in the range of about 110 nm to about 137 nm when the phase retardation value in the surface direction Ro is in the range of about 39 nm to about 53 nm including 45 nm and 50 nm.

FIG. 8A and FIG. 8B are photographic views showing graphs that represent variation of image quality according to driving time of the conventional LCD and the LCD of the present invention.

Referring to FIG. 8A, when the driving time of the conventional LCD is 100 hours or less, brightness is uniform over the whole area of the screen. However, as the driving time increases, brightness increases at the corner of the screen, causing corner Mura.

Referring to FIG. 8B, when the thickness of the support film serving as the compensation film is reduced, brightness is uniformly formed over the whole area of the screen even if the driving time of the LCD increases. In this manner, the thinner support film included in the polarizer can prevent the image quality degradation caused by the corner Mura.

A method of fabricating the polarizer having the support film with reduced thickness will be described below.

Figure 9A:
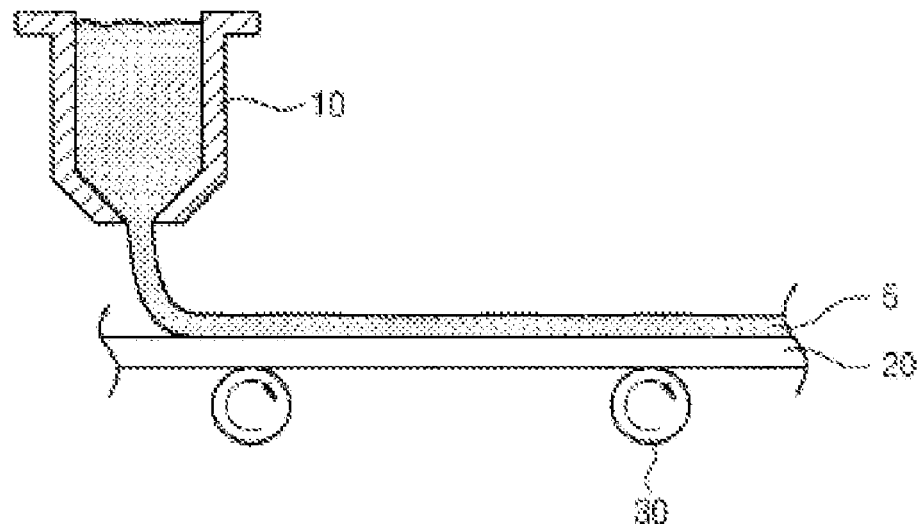
FIG. 9A, FIG. 9B, and FIG. 9C are views showing a fabrication procedure for a polarizer according to an exemplary embodiment of the present invention.
Figure 9B:
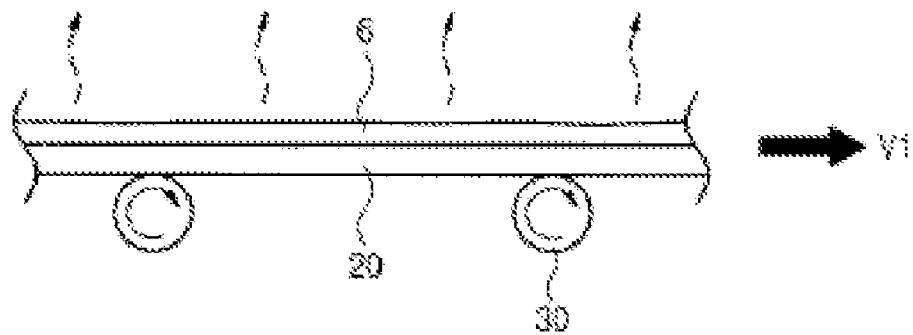
Figure 9C:
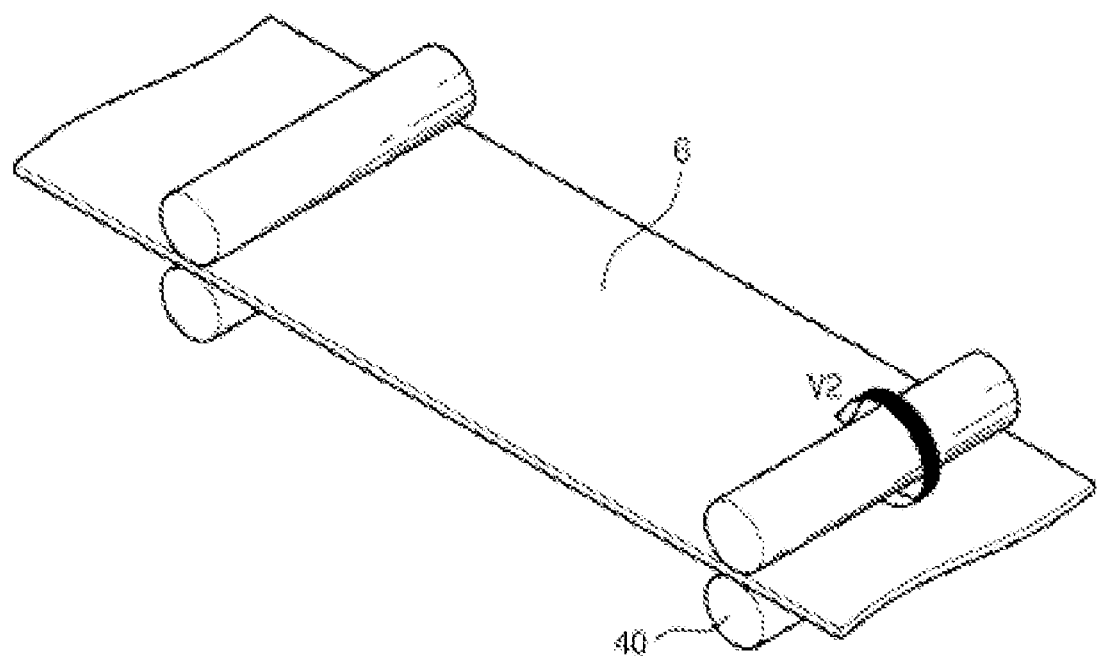

FIG. 9A, FIG. 9B, and FIG. 9C are views showing a fabrication procedure for a polarizer according to an exemplary embodiment of the present invention.

Referring to FIG. 9A, a container 10, a stage 20, and a transfer unit 30 are prepared. A solution 5 including polymer resin to fabricate the support film is contained in the container 10. The polymer resin includes Cellulose Diacetate Propionate compound. The container 10 is spaced apart from the stage 20, and the solution 5 is discharged onto the stage 20 from the container 10 through an exhaust port formed at the lower end portion of the container 10. The transfer unit 30 rotates while contacting the bottom of the stage 20, thereby moving the stage 20 on which the solution 5 is placed.

Referring to FIG. 9B, the stage 20 may move at a constant speed V1 so that solvent is evaporated from the solution 5. As the solvent evaporates from the solution 5, the optical film 6 mainly made of polymer resin including Cellulose Diacetate Propionate compound is formed on the stage 20.

Referring to FIG. 9C, the elongation process is performed with respect to the optical film 6. During the elongation process, a pair of rotating rolls 40 rotate while contacting top and bottom surfaces of the optical film 6. The rotating rolls 40 apply pressure to the optical film 6, thereby elongating the optical film 6. Here, the optical film 6 is elongated in one direction. Although a rotating roller is shown, various elongation devices can be used if they can elongate the optical film 6.

The rotating speed V2 of the rotating roller 40 corresponds to the transfer speed V1 of the stage 20. For example, the rotating speed V2 may equal the transfer speed V1. In this case, the elongation process is performed as soon as the optical film 6 is formed, so that the fabrication process can be rapidly performed. In addition, as the speed of the rotating roller 40 increases, greater pressure is applied to the optical film 6 during the elongation process, so that the thickness of the optical film 6 can be easily reduced.

The support film for optical compensation is obtained from the optical film 6 through the elongation process. The support film having the support function can be formed without performing the elongation process. In the case of the support film having the support function, Tri Acetate Cellulose is used instead of Cellulose Diacetate Propionate. The polarizing film is fabricated separately from the above process by using poly vinyl alcohol. After that, the support film for optical compensation and the support film having the support function are attached to both sides of the polarizing film by a bonding agent, respectively, thereby providing the polarizer.

The polarizer and the LCD having the same according to exemplary embodiments of the present invention may improve image quality at the front and lateral sides of the LCD by preventing the corner Mura.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A polarizer, comprising:
   a polarizing film;
   a first support film attached to one side of the polarizing film, the first support film having optical anisotropy and biaxial refractive index anisotropy and having a first thickness of 70 μm or less; and
   a second support film attached to the other side of the polarizing film while facing the first support film and having a second thickness, the second thickness being greater than the first thickness.

2. The polarizer of claim 1, wherein the first thickness is in a range of about 30 μm to about 50 μm.

3. The polarizer of claim 1, wherein the first support film has a phase retardation value in a surface direction of about 39 nm to about 53 nm, and a phase retardation value in a thickness direction of about 110 nm to about 137 nm.

4. The polarizer of claim 1, wherein the first support film comprises a Cellulose Diacetate Propionate compound.

5. The polarizer of claim 4, wherein the second support film comprises a Tri Acetate Cellulose compound.

6. The polarizer of claim 1, wherein the first support film is directly attached to the one side of the polarizing film, and the second support film is directly attached to the other side of the polarizing film.

7. A liquid crystal display, comprising:
   a liquid crystal panel comprising a first substrate, a second substrate facing the first substrate, and a liquid crystal layer therebetween; and
   a polarizer attached to at least one of the first substrate and the second substrate,
   wherein the polarizer comprises:
   a polarizing film;
   a first support film attached to one side of the polarizing film, the first support film having optical anisotropy and biaxial refractive index anisotropy and having a first thickness of 70 μm or less; and
   a second support film attached to the other side of the polarizing film while facing the first support film and having a second thickness, the second thickness being greater than the first thickness.

8. The liquid crystal display of claim 7, wherein the first thickness is in a range of about 30 μm to about 50 μm.

9. The liquid crystal display of claim 7, wherein the first support film has a phase retardation value in a surface direction of about 39 nm to about 53 nm, and a phase retardation value in a thickness direction of about 110 nm to about 137 nm.

10. The liquid crystal display of claim 7, wherein the first support film comprises a Cellulose Diacetate Propionate compound.

11. The liquid crystal display of claim 10, wherein the second support film comprises a Tri Acetate Cellulose compound.

12. The liquid crystal display of claim 7, wherein the liquid crystal panel further comprises a pixel electrode disposed on the first substrate and a common electrode disposed on the second substrate, and the polarizer is attached to the second substrate.

13. The liquid crystal display of claim 7, wherein the first support film is directly attached to the one side of the polarizing film, and the second support film is directly attached to the other side of the polarizing film.

* * * * *